United States Patent Office 3,756,878
Patented Sept. 4, 1973

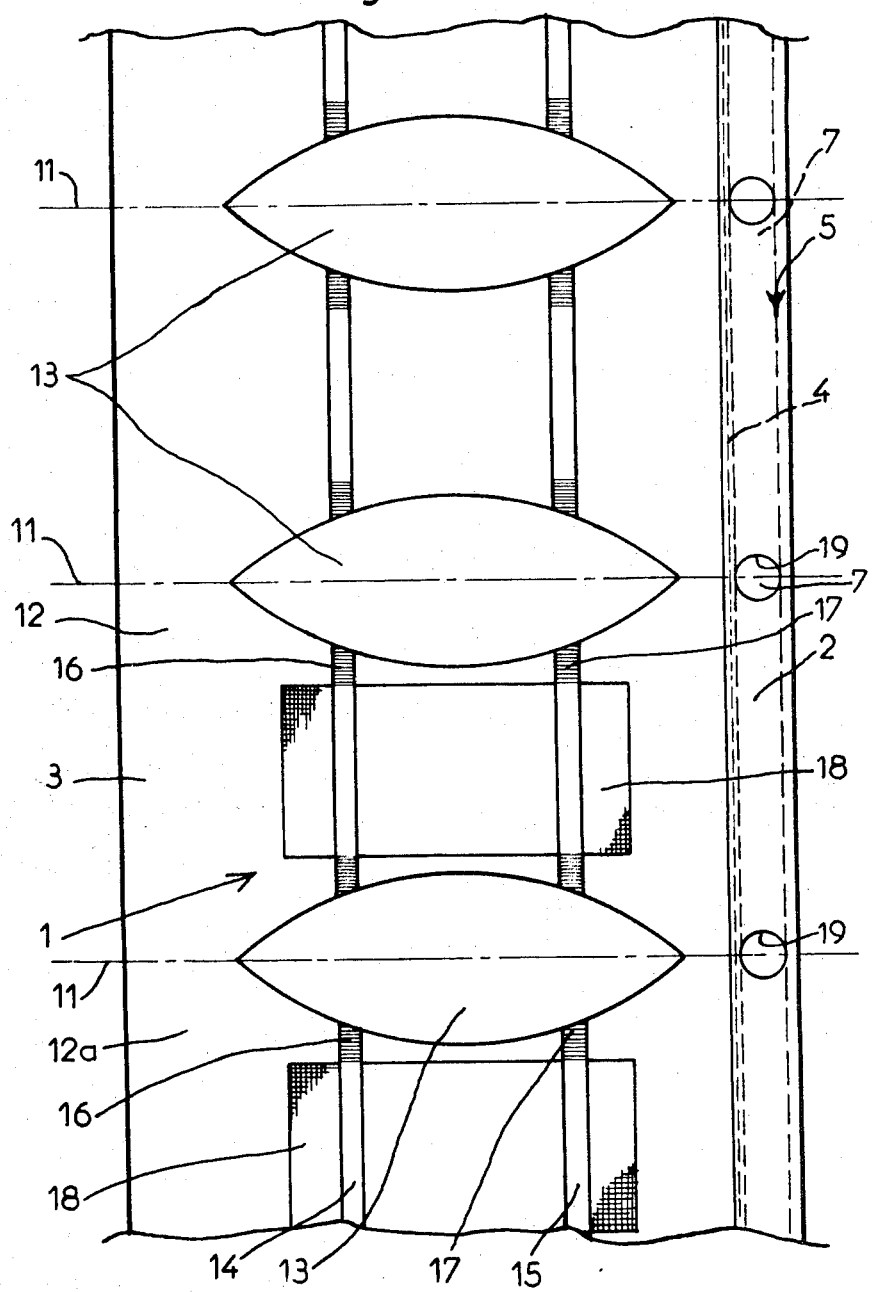

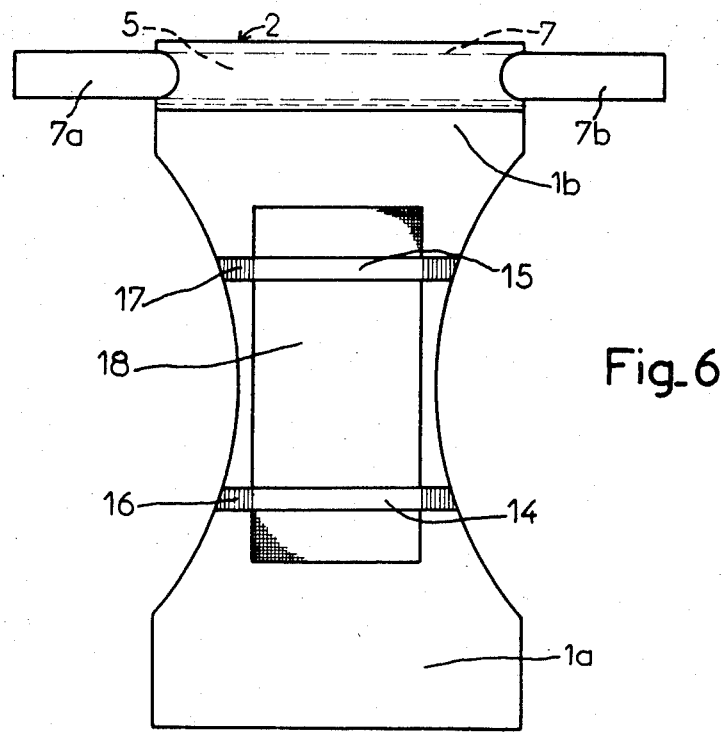
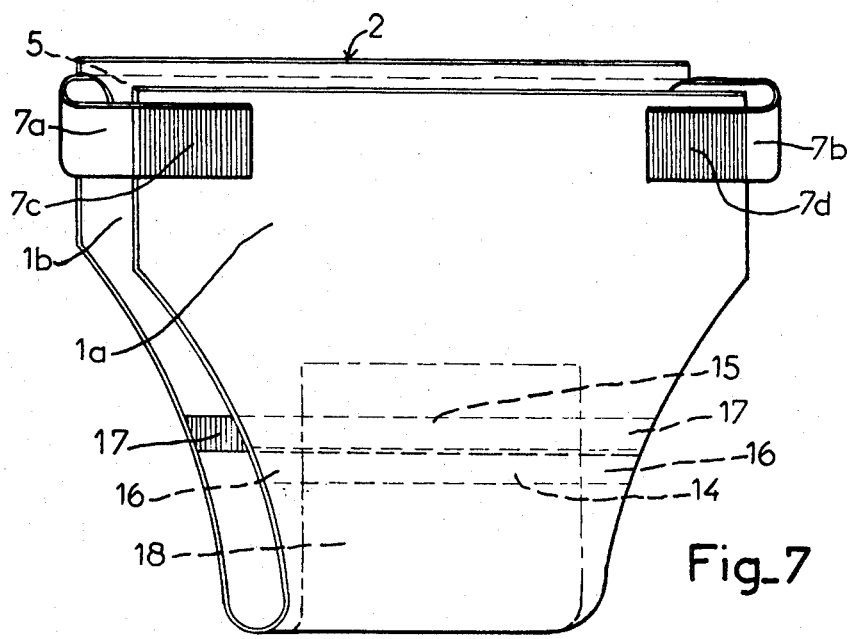

3,756,878
DISPOSABLE PANTS AND THE METHOD OF MANUFACTURING SAME
Antoine Willot, Flers, Nord, France, assignor to Consortium General Textile, S.A., Linselles, France
Filed Mar. 26, 1971, Ser. No. 128,478
Claims priority, application France, Mar. 26, 1970, 7011065; May 14, 1970, 7017751
Int. Cl. A41h 3/00
U.S. Cl. 156—70                              6 Claims

ABSTRACT OF THE DISCLOSURE

This invention relates to disposable pants formed of plastic sheet having means for retaining an absorbent pad. The pants are formed by a method characterized by the feature that a band of flexible material is continuously advanced, at least one of the longitudinal edges of the said band is folded on itself and kept thus folded at least in places, so as to form a longitudinal passage. A draw tie or fastening means is housed in the longitudinal channel. There are formed in the central portion of the band cut-out sections which are symmetrical with respect to equidistant transverse lines and form leg openings, and the said band is cut along the said transverse lines so as to separate the pants from one another.

---

This invention relates to a method of manufacture of disposable pants made from flexible material, for example woven or non-woven textile material or plastics material such as polyethylene. The articles produced are intended to receive an absorbent pad, such as a baby's napkin or sanitary towel.

The use of simple plastic sheets to retain absorbent napkins which may be fastened about the infant's waist is known. The waist portion of these sheets may be provided with an elastic element to provide tension.

Unfortunately, these disposable pants have not been successfully produced by a continuous operation. Moreover, complex and expensive installations have been required making the cost price of the article too high for one-time-use disposable articles.

The present invention suggests the inexpensive manufacture of "disposable pants" having a realistic market price.

The invention consists in a method of manufacture of disposable pants made of a flexible material such as polyethylene, or woven or non-woven textile material, the said pants being more particularly intended to receive an absorbent pad, such as a baby's napkin or sanitary towel, characterised by the feature that a band of flexible material is continuously advanced, at least one of the longitudinal edges of the said band is folded on itself and kept thus folded at least in places, so as to form a longitudinal channel. A tie or fastening means is housed in the longitudinal channel. There are formed in the central portion of the band cut-out sections which are symmetrical with respect to equidistant transverse lines, which can be imaginary, and form leg openings, and the band is cut along the transverse lines so as to separate the pants from one another.

The invention likewise relates to the article produced by the method.

The invention will now be described, by way of example, with reference to the accompanying drawings, in which:

FIG. 5 is a plan view illustrating an alternative form of the method of manufacture of the pants according to the invention, the band being shown flat before folding about the longitudinal axis;

FIG. 6 is an elevation view of a pair of pants obtained after transverse cutting of the band shown in FIG. 5; and FIG. 7 is an elevation view of a pair of pants in the form assumed when affixed to the body of the wearer.

In order to obtain disposable pants according to the first embodiment shown, a plastic sheet or band 1 such as polyethylene is introduced into a machine, then the longitudinal marginal edges 2 and 3 are folded and secured by heat welding at points or in a continuous longitudinal line 4. Thus formed, longitudinal marginal channels 5, 6 are defined for housing draw ties, draw ribbons or fastening means 7, 8.

Figure 1:
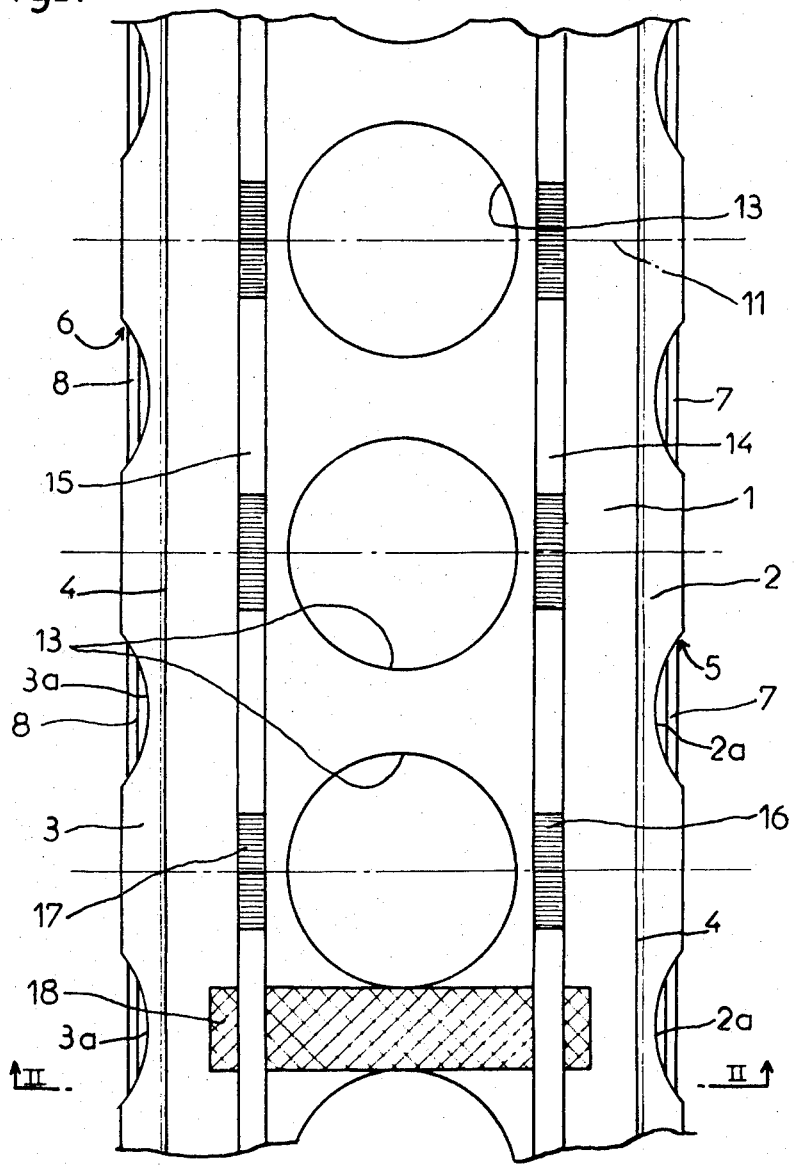
FIG. 1 is a plan view of a band in course of manufacture of the pants, the folding being about the longitudinal axis.
Figure 2:
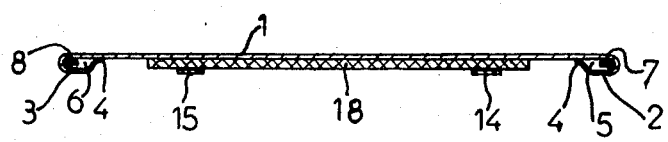
FIG. 2 is a sectional view along the line II—II of FIG. 1.
Figure 3:
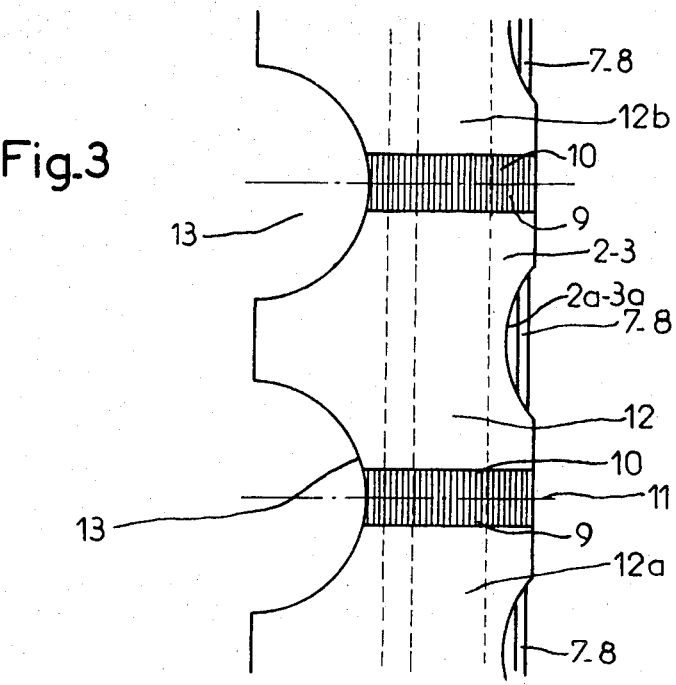
FIG. 3 is a plan view of a band of finished pants before separation along the transverse cutting lines.

One of the halves of the sheet is then folded longitudinally atop the other (as shown in FIG. 3), and retained in this position at regular intervals by two transverse fixing bands 9 and 10. A transverse cutting plane 11, intended to separate the pants 12, 12a, 12b, etc. from one another, is situated between the bands.

A cut-out section 13, preferably arcuate, is formed symmetrically on either side of each cutting plane 11, to define the leg opening.

The transverse fixing bands 9 and 10 consist of heat welding lines. The heat welding of the bands simultaneously secure the ribbons 7 and 8 at each end of the end of one article.

Before introduction of the ribbon 7 or 8 at least the corresponding edge 2 or 3 is cut out so as to form slots 2a and 3a which render the ribbon 7 or 8 visible so that it can be taken hold of.

In a preferred embodiment, at predetermined distances from the edges 2 and 3 are arranged tapes 14, 15 parallel with the said edges and fixed in place on the band 1. The longitudinal spacing between two fixing zones 16 and 17 is chosen to allow the affixing of an absorbent pad 18 between the band 1 and the tapes 14 and 15.

Figure 4:
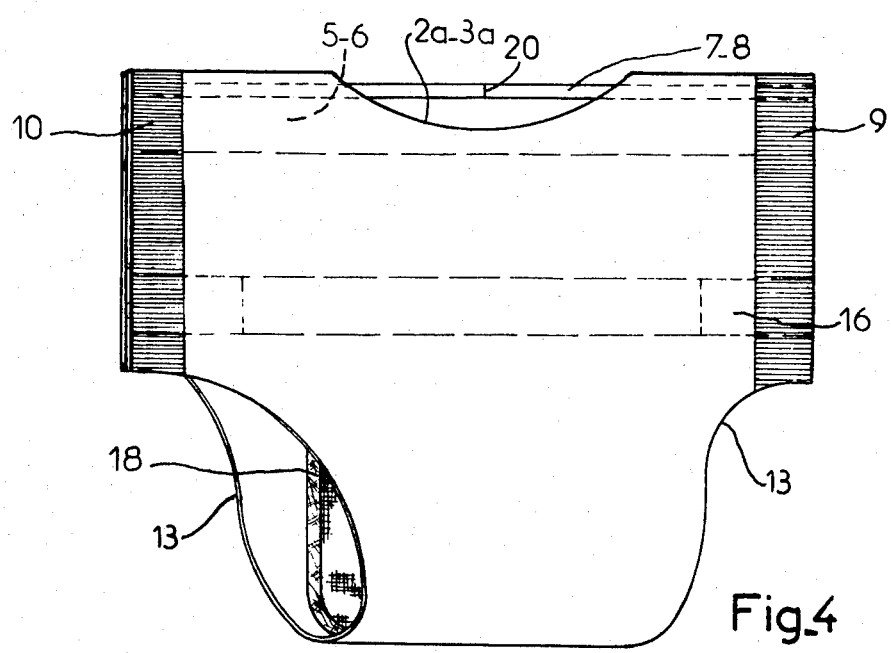
FIG. 4 is an elevation view of a pair of pants obtained after cutting.

Thus made, a pair of pants (FIG. 4) has a minimal cost price and allows its sale as a "disposable" article. To secure them on the body it is merely necessary to take hold of the ribbon 7 and/or 8 and withdraw it partly from its passage by sliding it inside the latter, so that the waist can be tightened.

In an alternative embodiment the ribbon 7 or 8 comprises in the portion visible through the slots 2a and/or 3a in the edge 2 and/or 3, a breakable or separable section 20 enabling the user to break the tie easily and to use the two ends to make a knot or tie a bow after splitting of the free ends of the sections thus delimited.

To produce disposable pants according to the second embodiment (FIG. 5), a sheet of flexible material 1 is introduced into a machine, then one of the longitudinal edges 2 and 3 is folded on itself and retained in this position by spot or continuous heat welding 4 to form a channel 5 housing the tie 7.

The pants 12, 12a are then separated from one another by imaginary cutting along the transverse cutting lines 11.

A cut-out section 13, for example oval, forming a leg opening, is arranged symmetrically on either side of each imaginary cutting line 11.

Tapes 14 and 15 fixed to the sheet 1 in places in zones 16 and 17 are arranged at a certain distance from the edges 2.

The longitudinal spacing between fixing zones 16 or 17 is chosen so as to allow affixing of an absorbent pad 18 between the tapes 14 and 15 and the sheet 1.

The tie 7 contained in each passage portion 5 corresponding to one pair of pants after cutting, has a length greater than the width of the pants. The excess length of the tie is contained in the said passage 5. The ends 7a, 7b of the tie 7 preferably are visible through notches 19 provided in the edge 2 at each end of a channel section 5, that is to say centered on the transverse cutting lines 11. The ends have at least one self-adhesive portion, protected against unintentional sticking by a protective strip 7c, 7d, removed before use. In use the front half 1a of the plastics sheet is folded on to the other back half 1b and the self-adhesive parts of the ends 7a, 7b of the tie 7 are applied to the second half by their self-adhesive product (FIG. 7).

In an alternative form the tie 7 has a length sufficient to encircle the body of the user, fixing then being effected by tying in a bow (not shown).

I claim:

1. A method of manufacturing disposable pants made of a flexible material such as polyethylene woven or nonwoven textile material comprising, providing a band of flexible material, folding one longitudinal marginal side portion of the band and permanently retaining the fold forming a longitudinal channel, removing sections of said flexible material to form cut-outs disposed spaced from each other along a longitudinal axis of symmetry of the band and disposed equidistant from each other symmetrically with respect to equidistantly disposed imaginary parallel lines transversely of the band defining adjoining lengths of said band, severing the band along said imaginary lines, and prior to severing said band removing other sections of said flexible material along the fold to form other cut-outs intermediate said imaginary lines for viewing of individual portions of a draw tie in the channel, introducing an elongated draw tie into said channel having weakened sections in registry with said other cut-outs for easily separating the draw tie at each section and securing lengths of the draw tie in the channel permanently to the corresponding lengths of said band.

2. A method of manufacturing pants made of a flexible material such as polyethylene woven or non-woven textile material according to claim 1, including folding a second longitudinal side portion of said band and permanently retaining the second fold forming a second longitudinal channel, removing other sections of said flexible material along the second fold to form cut-outs intermediate said imaginary lines for viewing of individual portions of a second draw tie in the second channel prior to severing of said band introducing into said second channel a second elongated draw tie having weakened sections in registry with said cut-outs on said second fold for easily separating the second draw tie at each section, and securing lengths of said second draw tie in the second channel permanently to corresponding lengths of said band.

3. A method of manufacturing disposable pants made of a flexible material such as polyethylene woven or nonwoven textile material comprising, providing a band of flexible material, folding both longitudinal marginal side portions of the band and permanently retaining the folds forming two longitudinal channels, removing sections of said flexible material to form cut-outs disposed spaced from each other along a longitudinal axis of symmetry of the band and disposed equidistant from each other symmetrically with respect to equidistantly disposed imaginary parallel lines transversely of the band defining adjoining lengths of said band, severing the band along said imaginary lines, and prior to severing said band removing other sections of said flexible material along the two folds to form other cut-outs intermediate said imaginary lines for viewing of individual portions of two draw ties in the respective two channels, introducing two elongated draw ties into respective ones of said channels each having weakened sections in registry with said other cut-outs on the respective folds for easily separating the draw tie at each section, and securing lengths of the draw tie in the respective channel permanently to corresponding lengths of said band.

4. A method of manufacturing disposable pants made of a flexible material such as polyethylene woven or nonwoven textile material according to claim 3, in which said two draw ties are secured on said corresponding lengths of said band along zones in each length, and disposing in each length on absorbent pad between said zones thereof between said draw ties underlying the draw ties and held thereby.

5. A method of manufacturing disposable pants made of a flexible material such as polyethylene woven or nonwoven textile material according to claim 3, in which securing of said two draw ties comprises securing each draw tie along two spaced zones in each length of said band and having said zones spaced in each length for allowing of insertion of a corresponding absorbent pad underlying the two draw ties in each respective length and held thereby.

6. A method of manufacturing disposable pants made of a flexible material such as polyethylene woven or nonwoven textile material comprising, providing a band of flexible material, folding at least one longitudinal marginal side portion of the band and permanently retaining the fold forming a longitudinal channel, removing sections of said flexible material to form cut-outs disposed spaced from each other along a longitudinal axis of symmetry of the band and disposed equidistant from each other symmetrically with respect to equidistantly disposed imaginary parallel lines transversely of the band defining adjoining lengths of said band, severing the band along said imaginary lines to form pairs of pants therefrom, prior to severing said band introducing an elongated draw tie into said channel having lengths thereof in the longitudinal channel corresponding to respective adjoining lengths of said band of greater length than the length of the respective lengths of the band, and the excess of each length of the draw tie being accommodated within the channel.

References Cited
UNITED STATES PATENTS

| | | | |
|---|---|---|---|
| 2,779,333 | 1/1957 | Gordon | 128—287 |
| 3,196,757 | 7/1965 | Samways | 93—35 |
| 3,042,043 | 7/1962 | Wuhrlin | 128—284 |

EDWARD G. WHITBY, Primary Examiner

U.S. Cl. X.R.

128—284, 287, 290; 156—202, 250, 253